United States Patent [19]

Matsumoto et al.

[11] Patent Number: 4,690,010

[45] Date of Patent: Sep. 1, 1987

[54] ROBOT ARM DRIVE APPARATUS OF INDUSTRIAL ROBOT

[75] Inventors: Kazuyuki Matsumoto, Ogaki; Mashataka Hashimoto; Michiyoshi Iwata, both of Fuwa, all of Japan

[73] Assignee: Teijin Seiki Company Limited, Osaka, Japan

[21] Appl. No.: 890,971

[22] Filed: Jul. 29, 1986

Related U.S. Application Data

[63] Continuation-in-part of Ser. No. 817,106, Jan. 8, 1986, abandoned.

[30] Foreign Application Priority Data

Jan. 18, 1985 [JP]  Japan .................................. 60-7856
Mar. 18, 1985 [JP]  Japan ................................ 60-53866

[51] Int. Cl.⁴ ..................... B66C 23/00; F16H 1/28; H02K 7/02
[52] U.S. Cl. .................................. 74/469; 74/804; 310/83; 901/25; 901/28
[58] Field of Search ............... 74/469, 804; 310/80, 310/82, 83, 99; 414/744; 901/23, 24, 25, 26, 28, 29

[56] References Cited

U.S. PATENT DOCUMENTS

| | | | |
|---|---|---|---|
| 3,129,611 | 4/1964 | Lee | 74/804 |
| 4,348,918 | 9/1982 | Fukui | 74/804 |
| 4,431,366 | 2/1984 | Inaba et al. | 414/718 |
| 4,518,308 | 5/1985 | Grzybowski et al. | 901/28 |
| 4,574,659 | 3/1986 | Arndt | 74/804 |

FOREIGN PATENT DOCUMENTS

| | | |
|---|---|---|
| 2527603 | 12/1976 | Fed. Rep. of Germany . |
| 2745932 | 6/1978 | Fed. Rep. of Germany . |
| 3325973 | 4/1984 | Fed. Rep. of Germany . |
| 56-152594 | 11/1981 | Japan . |
| 57-16714 | 4/1982 | Japan . |
| 58-211881 | 12/1983 | Japan . |
| 59-106744 | 6/1984 | Japan . |
| 59-121255 | 7/1984 | Japan . |
| 59-115189 | 7/1984 | Japan . |
| 59-175986 | 10/1984 | Japan . |

*Primary Examiner*—Patrick R. Salce
*Assistant Examiner*—D. L. Rebsch
*Attorney, Agent, or Firm*—Cushman, Darby & Cushman

[57] ABSTRACT

A robot arm drive apparatus of an industrial robot comprising: an electric motor having a drive shaft; a first robot member having the electric motor mounted thereon; a second robot member rotatably supported on the first robot member; and reduction gear means for reducing rotation of the electric motor and then transmitting to the second robot member. The reduction gear means has a primary reduction gear for reducing the rotation of the electric motor and a secondary, planetary reduction gear for further reducing rotation of output of the primary reduction gear. The primary reduction gear has a reduction ratio such that the maximum number of rotations of the electric motor is reduced less than the characteristic torsion frequency of the drive system. The secondary reduction gear has an eccentric input shaft connected with the primary reduction gear, an external gear which is rotatable eccentrically in response to rotation of the input shaft, an internal gear held in mesh with the external gear, and larger in number of teeth than the external gear by one, and carrier means held in engagement with the external gear.

11 Claims, 11 Drawing Figures

ROBOT ARM DRIVE APPARATUS OF INDUSTRIAL ROBOT

This is a continuation-in-part of application Ser. No. 817,106 filed Jan. 8, 1986 which was abandoned upon the filing hereof.

FIELD OF THE INVENTION

The present invention relates in general to a robot arm drive apparatus of an industrial robot and in particular to an improved robot arm drive apparatus which can prevent occurrence of resonance of the robot arms.

SUMMARY OF THE INVENTION

In accordance with an important aspect of the present invention, there is provided a robot arm drive apparatus of an industrial robot comprising: an electric motor having a drive shaft; a first robot member having the electric motor mounted thereon; a second robot member rotatably supported on the first robot member; and reduction gear means for reducing rotation of the electric motor and then transmitting to the second robot member; the reduction gear means comprising a primary reduction gear for reducing the rotation of the electric motor and a secondary, planetary reduction gear for further reducing rotation of output of the primary reduction gear; the electric motor, when in normal operation, having the number of rotations which include the characteristic torsion frequency of a drive system comprising the electric motor, the second robot member and the reduction gear means; the primary reduction gear having a reduction ratio so that the maximum number of rotations of the electric motor is reduced less than the characteristic torsion frequency of the drive system; the secondary reduction gear comprising an eccentric input shaft connected with the primary reduction gear, an external gear which is rotatable eccentrically in response to rotation of the input shaft, an internal gear held in mesh with and larger in number of teeth than the external gear by one, and carrier means held in engagement with the external gear.

DESCRIPTION OF THE PRIOR ART

In industrial robots, an electric servo motor or electric pulse motor having a characteristic of high speeds and low torques, and reduction gear means converting the output of the electric motor into low speeds and high torques have been widely employed in robot arm drive apparatuses for driving the articulated robot arms or members and the like, in order that suitable torques required for driving the articulated robot arms are obtained. Such reduction gear means is required to have a large reduction ratio on the order of 1/120 and a small backlash, and be light in weight to minimize influence of force of inertia.

A representative known reduction gear means which meets such requirements is described as a harmonic gear (trade name: harmonic drive), for example, in Japanese Laid-open Publication No. 59-175986 and as an eccentric-rotation type planetary differential gear in Japanese Laid-open Publication No. 59-106744. In general, the former reduction ratio is in the range of between about 1/80 and about 1/320, while the latter is in the range of between about 1/6 and about 1/200. The harmonic gear is smaller in diameter and lighter in weight per reduction ratio than the planetary differential gear. In addition, the harmonic gear itself has a reduction ratio and mechanical strength necessary for as a reduction gear of the robot arm drive apparatus for driving the articulated robot arms. Harmonic gears are therefore employed widely as reduction gear means of the robot arm drive apparatus. If a large reduction ratio is required, for example, if a reduction ratio of the order of 1/625 is required in the case that a small capacity and high speed type motor having output of less than 1000 watts and the number of rotations of 5000 rpm is employed for driving the robot arms, the harmonic gear is connected with a primary reduction gear as disclosed in Japanese Laid-open Publication No. 56-152594.

However, if the above-noted reduction gears are employed in the robot arm drive apparatus of the industrial robots, each of the reduction gears has the drawback that torsion resonance of the reduction gear and the robot arm occurs in the low speed region, in which the number of rotations of the electric motor used as input is small. Because of the resonance, the torsional vibration is produced frequently in the vicinity of the articulated portion of the articulated robot arms, so that the forward end portions of the robot arms can not be positioned properly. The reason why the torsion resonance occurs is as follows. Since the rigidity of each of the above-noted reduction gears which serve as torque transmission mechanism of the electric motor is relatively low, the characteristic torsion frequency $\omega_o$ of the drive system (comprising such reduction gear, the electric motor and the robot arm) becomes low. Therefore, the torsion resonance occurs when the frequency of the reduction gear which is caused to vibrate by error of gear cutting, etc., becomes in consistent with the characteristic frequency $\omega_o$ of the drive system in the low speed region of the electric motor.

In order to obviate such problem, Japanese Laid-open Publication No. 58-211881 discloses an electric control method which varies a command signal indicative of speed of the electric motor so that the vibration produced is eliminated. However, in this method, the apparatus associated with the method itself becomes unstable if the feed back gain of the method is increased. In particular, in the robot arm drive apparatus of the industrial robot in which the rigidity thereof is small, the larger gain causes the apparatus to vibrate easily, thereby resulting in the torsion resonance. For this reason, such method is unsuitable for the robot arm drive apparatus of the industrial robot. Also, in Japanese Laid-open Publication No. 59-175986, it has been proposed to drive the reduction gear by the high tensioned timing belt and absorbed the vibrations with the timing belt. However, the high tensioned timing belt incurs the danger of break. Also, in Japanese Laid-open Publication No. 59-115189, it has been proposed that the damping apparatus comprising a spring and a weight is connected to the main shaft of the reduction gear. However, some disadvantages are involved in that the damping apparatus is damaged by centrifugal force and that the weight, etc., have to be replaced with a suitable weight according to the variation of load weight of the robot.

It is, accordingly, an important object to provide an improved robot arm drive apparatus which can prevent the torsion resonance which is inevitably inherent in the prior art apparatus.

First of all, the inventors calculated whether the characteristic torsion frequency $\omega_o$ of the drive system of the robot can be transferred or not outside the range of the normal operational region of the electric motor by using a reduction gear having a characteristic of high spring constant under rotation in the robot arm drive apparatus of the industrial robot. However, since the spring constant $K_l$ under rotation in the vicinity of the neutral position (a so-called lost-motion position) of the reduction gear is at most 1/10 to 1/5 of the spring constant $K_2$ under rotation of the robot arm itself, the spring constant $K = K_l \cdot K_2/(K_l + K_2)$ of the drive system itself cannot be much increased. As a consequence, the characteristic torsion frequency $\omega_0$ of the drive system also cannot be much increased. It has therefore been concluded that the characteristic torsion frequency $\omega_0 = \frac{1}{2}\pi \cdot \sqrt{k/J}$ of the drive system cannot be transferred outside the range of the normal operational region of the electric motor by increasing the spring constant $K_l$ under rotation of the reduction gear, that is, by increasing the rigidity.

The inventors attempted to eliminate fluctuation of torque of the reduction gear which is causative of vibration. An eccentric-rotation type planetary differential gear was employed so that the fluctuation of torque was eliminated or prevented. The teeth of the internal and external gears of the reduction gear were finished accurately, and in order to absorb the fluctuation of torque, even if it occurred, annular grooves were provided in bearing portions of eccentric input shafts and shaft support portions of torque pickup pins, and further rubber rings were provided in the annular grooves. However, it has been found that such attempts cannot prevent the resonance in the normal operational region of the electric motor, and moreover the number of rotations of the electric motor at which the resonance occurs does not change much as compared with the case where the attempts are not made.

From these experimental results, it has been concluded that a reduction gear of fixed mechanism has a fixed characteristic of torque fluctuation with respect to the drive system of the robot. From such conclusion, various experiments were made on the hypothesis that the characteristic of torque fluctuation can be transferred outside the normal operational region by modifying the mechanism of the reduction gear which is to be employed in the robot arm drive apparatus of the industrial robot. These experiments and the results will be hereinafter described; in conclusion, the hypothesis was substantiated by the arrangement which is novel and unthinkable from conventional common sense. Namely, the range of the torsion resonance was transferred outside the normal operational range of the electric motor by providing a novel reduction gear in which the eccentric-rotation type planetary differential reduction gear has a teeth difference of 1 between the internal and external gears, and the reduction ratio of the planetary differential reduction gear which is capable of being reduced to the order of 1/200 is reduced to one-to-several tenths, and in addition to this gear, a primary reduction gear having a reduction ratio of a certain range is provided purposely.

It is noted that reduction gear means in which a primary reduction gear is connected to an eccentric-rotation type planetary differential reduction gear is disclosed in the U.S. Pat. No. 4,348,918 and used for driving crawler vehicles. However, in such reduction gear means used in the crawler vehicles, the weight, backlash, etc., of the reduction gear is not an important problem. Therefore, the primary reduction gear is provided only in order to modify easily the total reduction ratio of the reduction gear means or obtain a low speed and high torque. On the other hand, in the industrial robot which requires accuracy of position, high efficiency of operation, etc., and in which the rigidity of the overall construction is small, it is an important problem to decrease the weight of the reduction gear and minimize the backlash. For this reason, it was unthinkable that the eccentric rotation type planetary differential gear, the weight of which is larger per reduction ratio than that of the harmonic gear would be employed, and in addition to this gear, the primary reduction gear which results in increased weight and backlash would be provided purposely.

BRIEF DESCRIPTION OF THE DRAWINGS

The features and advantages of a robot arm drive apparatus of an industrial robot constructed in accordance with the present invention will be more clearly understood from the following description in which like reference numerals designate corresponding or similar members throughout the figures of the drawings and in which.

DETAILED DESCRIPTION OF THE PREFERRED EMBODIMENTS

Figure 1:
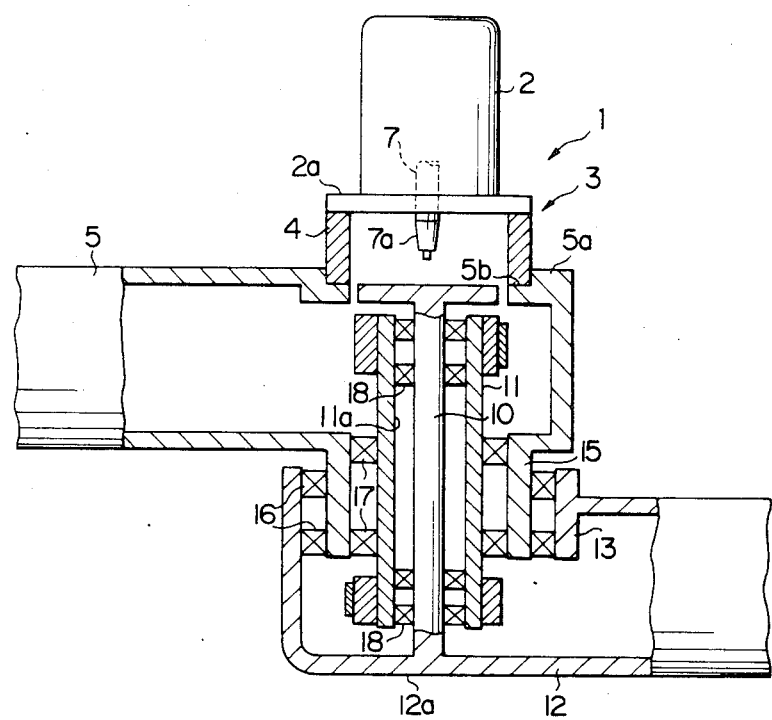
FIG. 1 is a side elevational view, partly broken away, showing the robot arm drive apparatus constructed in accordance with the present invention.
Figure 2:
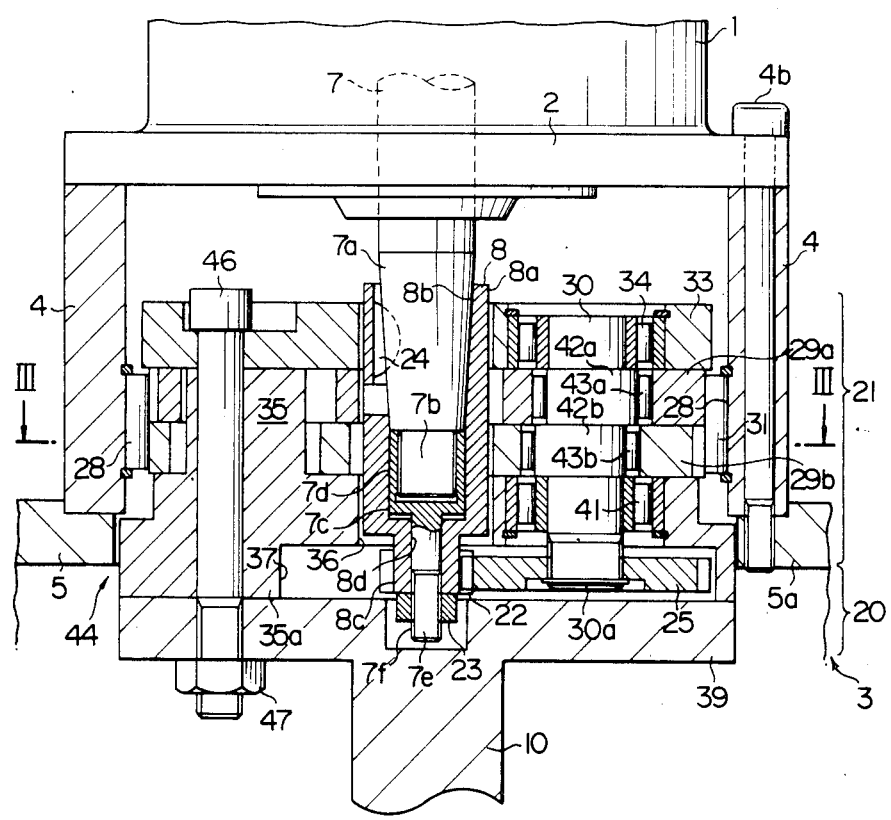
FIG. 2 is a vertical sectional view showing reduction gear means of the present invention comprising primary and secondary reduction gears.

Referring now in greater detail to the drawings and initially to FIG. 1, the robot arm drive apparatus of an industrial robot according to the present invention is designated generally by reference numeral 1. An electric motor 2 is securely mounted through its flange portion 2a on a cylindrical support member 4 of reduction gear means 3. The cylindrical support member 4 in turn is securely mounted on a front end portion 5a of a first horizontally extending robot arm or a first robot member 5 through a flange portion 5b formed in the front end portion 5a. The motor 2, the reduction gear means 3 and the first horizontal robot arm 5 are held in tightly assembled relationship by suitable clamping means such as, for example, clamping bolts 4b (FIG. 2). A drive shaft 7 of the electric motor 2 is connected through its lower end portion 7a to an input shaft 8 (FIG. 2) of the reduction gear means 3. Output of the reduction gear means 3 is transmitted to a vertical shaft 10 extending into a vertical bore 11a formed in a sleeve member 11 and connected integrally to a second horizontally extending, robot arm or a second robot member 12. A cylindrical protrusion 15 of the first horizontal robot arm 5 projects downwardly from the front end portion 5a of the first horizontal robot arm 5 into an annular, vertically extending flange portion 13 formed in the rear end portion 12a of the second horizontal robot arm 12. A pair of bearings 16 and 16 are interposed between the cylindrical protrusion 15 of the first horizontal robot arm 5 and the flange portion 13 of the second horizontal robot arm 12. Between the cylindrical protrusion 15 of the first horizontal robot arm 5 and the sleeve member 11 are interposed a pair of bearings 17 and 17, and between the sleeve member 11 and the vertical shaft 10 of the second horizontal robot arm 12 are interposed two pairs of bearings 18 and 18. Accordingly, the rear end portion 12a of the first horizontal robot arm 5 is rotatably supported on the front end portion 5a of the first horizontal robot arm 5. That is, the second horizontal robot arm 12 is rotatable on the rear end portion 12a thereof with respect to the front end portion 5a of the first horizontal robot arm 5. The electric motor 2, the reduction gear means 3, the second horizontal robot arm 12 and load connected to the second horizontal robot arm 12 as a whole, constitute a drive system.

Referring to FIG. 2, the reduction gear means 3 forming a part of the present invention is driven by the drive shaft 7 of the electric motor 2 and comprises a primary, parallel shaft type or spur reduction gear 20 connected with the drive 7 of the electric motor 2 and a secondary, planetary reduction gear 21 connected with the primary reduction gear 20.

The lower end portion 7a of the drive shaft 7 of the electric motor 2 is a tapered shaft and terminates in an externally threaded portion 7b. An extension shaft 7c forming a part of the drive shaft 7 is held in mesh with the externally threaded portion 7b of the drive shaft 7 through an upper portion 7d of the extension shaft 7c formed with an internally threaded bore. The extension shaft 7c has a long protrusion 7e of circular configuration extending downwardly from the upper portion 7d thereof and formed partially with an externally threaded portion 7f. An input shaft 8 of the reduction gear means 3 has at the upper end portion thereof a large radius portion 8a which is formed with a partially tapered bore 8b, in which the tapered portion 7a of the drive shaft 7 and the upper portion 7d of the extension shaft 7c are snugly received, and at the lower end portion thereof a small radius portion 8c which is formed with a bore 8d, through which the long protrusion 7e of the extension shaft 7c extends. The externally threaded portion 7f of the long protrusion 7e projects from the small radius portion 8c of the input shaft 8 and has a nut 23 threaded thereon so that the tapered portion 7a of the drive shaft 7 and the extension shaft 7c are conjugately connected to the input shaft 8. The tapered portion 7a of the drive shaft 7 is also held against rotation with respect to the input shaft 8 by means of a semicircular key 24. Thus, the input shaft 8 is caused to rotate on its rotational axis in response to rotation of the drive shaft 7. On the small radius portion 8c of the input shaft 8 of the reduction gear means 3 is provided a pinion or input gear 22 forming a part of the primary reduction gear 20 so that the pinion 22 is rotatable with the input shaft 8. By reason that the small radius portion 8c of the input shaft 8 is constructed to be smaller in radius than that of the drive shaft 7 of the electric motor 2, the number of teeth on the pinion 22 mounted on the small radius portion 8c of the input shaft 8 can be reduced as compared with the pinion directly mounted on the drive shaft 7. Accordingly, this arrangement can obtain a primary reduction ratio required for the primary reduction gear even in the case where a motor with a relatively larger shaft is employed. The pinion 22 is held in mesh with three spur gears 25 which are connected with three input crank shafts or eccentric input shafts 30, respectively, to be described hereinafter.

The secondary, planetary reduction gear 21 comprises an internal gear 28 mounted on the cylindrical support member 4, a pair of upper and lower external gears 29a and 29b each meshing with the internal gear 28, and three input crank shafts 30, each of which serves as an eccentric input shaft to cause the external gears 29a and 29b to rotate eccentrically with respect to the input shaft 8 of the reduction gear means 3. The internal gear 28 is constituted by a pin gear consisting of a plurality of pin teeth 31. The number of the pin gears 31 is larger than that of the teeth on the external gear 28 by one. The three input crank shafts 30 are supported equiangularly from one another by a circular plate 33 forming a part of the planetary reduction gear 21 through three bearings 34. A block member designated by reference numeral 35 is interposed between the circular plate 33 and the flange portion 39 of the vertical shaft 10 of the second horizontal robot arm 12, and formed with a central opening 36 through which the input shaft 8 of the reduction gear means 3 extends. Similarly, the circular plate 33 and the external gears 29a and 29b are formed with central openings, respectively, through which the input shaft 8 extends. The block member 35 is further formed at its lower end portion 35a with a deep indentation 37 of circular configuration defining in cooperation with the flange portion 39 of the vertical shaft 10 a gear chamber in which the primary reduction gear 20 is accommodated. The three input crank shafts 30 received at their upper ends in the corresponding bearings 34 in the circular plate 33 are also received in bearings 41 disposed equiangularly in the block member 35 and project into the gear chamber and then are secured at their lower ends 30a to the spur gears 25 of the primary reduction gear 20.

Each of the input crank shafts 30 supported by the circular plate 33 and the block member 35 has at its intermediate portion a pair of upper and lower crank portions 42a and 42b, the phase difference therebetween being 180°. The upper and lower crank portions 42a and 42b engage with the upper and lower external gears 29a and 29b, respectively, through bearings 43a and 43b so that the external gears 29a and 29b rotate eccentrically with respect to the input shaft 8. The block member 35 and the circular plate 33 as a whole constitute carrier or support means 44. The circular plate 33, the block member 35 and the flange portion 39 of the vertical shaft 10 are held in tightly assembled relationship by a plurality of bolts 46 and nuts 47.

Rotation of the electric motor 2 is transmitted through the drive shaft 7 thereof and the input shaft 8 to the pinion 22 of the primary reduction gear 20 and then is reduced to a predetermined speed by the primary reduction gear 20. Output of the primary reduction gear 20 is transmitted as input to the input crank shafts 30 of the secondary reduction gear 21 through the spur gears 25. Thereafter, rotations transmitted to the input crank shafts 30 are further reduced by the external gears 29a and 29b which are caused to rotate eccentrically by the rotations of the input crank shafts 30, and the internal gear 28 meshing with the external gears 29a and 29b and having teeth larger than that of each of the external gears 29a and 29b by one. The reduced rotations of the external gears 29a and 29b are transmitted to the vertical shaft 10 through the carrier means 44, so that the second robot arm 12 is caused to rotate on the rear end portion 12a thereof with respect to the front end portion 5a of the first robot arm 5.

In the embodiment constructed in accordance with the present invention, the number of rotations of the electric motor 2 which is in normal operation is in the range of between 1 and 1000 rpm. The primary reduction ratio $i_1$ of the primary reduction gear 20 is $\frac{1}{3}$, while the secondary reduction ratio $i_2$ of the secondary rezduction gear 21 is 1/40. The total reduction ratio i of the reduction gear means 3 is 1/120. The characteristic torsion frequency $\omega_o$ of the drive system constituted by the electric motor 2, the reduction gear means 3, the second robot arm 12 and load associated with the second robot arm 12 is approximately 8.4 hertz or 504 rpm. Accordingly, the characteristic torsion frequency $\omega_o$ of the drive system is within the normal operational region of the electric motor 2 ranging from 1 to 1000 rpm. On the other hand, the primary reduction gear 20 has the primary reduction ratio $i_1$ ($\frac{1}{3}$) so that the maximum number of rotations (16.7 revolution per second or 1000 rpm) of the electric motor 2 which is in normal operation is reduced to a value (approximately 5.6 revolutions per second or 333 rpm) which is less than the characteristic torsion frequency $\omega_o$ (504 rpm) of the drive system.

The operation of the embodiment constructed and arranged as mentioned above will be hereinafter described.

When the electric motor 2 rotates within the normal operational region of 1 to 1000 rpm, the rotation of the electric motor 2 is first reduced by $\frac{1}{3}$ to 333 rpm by the primary reduction gear 20 having a reduction ratio $i_1$ of $\frac{1}{3}$ and further by 1/120 to 8.3 rpm by the secondary reduction gear 21 having a reduction ratio $i_2$ of 1/40. In this case, it has been found that resonance does not occur within the normal operational region of the electric motor 2. The resonance occurs when the number of rotations of the electric motor 2 is around 1500 rpm which is beyond the normal operational region (at this time, the number of rotations of the primary reduction gear 20 is around 500 rpm (1500 rpm $\times \frac{1}{3}$ = 500 rpm) and the number of rotations of the secondary reduction gear 21 is around 12.5 rpm (1500 rpm $\times \frac{1}{3} \times$ 1/40 = 12.5 rpm)). The reason why the resonance occurs beyond the normal operational region of the electric motor 2 is not definite, but the reason is assumed as follows in accordance with the experimental results.

In the case of the planetary differential gear (the secondary reduction gear 21) having a teeth difference of one between the internal gear and the external gear as in the embodiment described hereinbefore, one fluctuation of torque is produced per one revolution of the input shaft (input crank shaft 30). Accordingly, if this planetary differential gear is connected with primary reduction gear 20, having a reduction ratio $i_f$ of $\frac{1}{3}$, about 500 fluctuations of torque per minute (1500 $\times \frac{1}{3} \times$ 1 = 500) are produced when the rotation of the electric motor 2 is around 1500 rpm which is beyond the normal operational region of the electric motor 2. It is assumed that this 500 fluctuations of torque per minute becomes substantially consistent with 504 rpm of the characteristic frequency $\omega_o$ of the drive system, thereby causing occurrence of the resonance.

In the case of the harmonic reduction gear having a teeth difference of two between the internal gear and the external gear, two fluctuations of torque are produced per one revolution of the input shaft (web generator). Accordingly, if this harmonic reduction gear is connected with the primary reduction gear having a reduction ratio $i_f$ of $\frac{1}{3}$, about 500 fluctuations of torque per minute (750 $\times \frac{1}{3} \times$ 2 = 500) are produced when the rotation of the electric motor 2 is around 750 rpm. If the characteristic torsion frequency $\omega_o$ of the drive system is 8.4 hertz or 504 rpm as in the above-noted embodiment, the resonance will occur when the rotation of the electric motor 2 is around 750 rpm which is within the normal operational region. In this case, since the resonance occurs when the number of fluctuations of torque is about 500, the rotation of the electric motor 2 at which the resonance occurs can be raised to around 1500 rpm which is beyond the normal operational region by providing a primary reduction gear having a reduction ratio $i_1$ of about 1/6 in the harmonic reduction gear. However, since the reduction ratio $i_2$ of the harmonic reduction gear is about 1/80 at minimum, the total reduction ratio i is about 1/480 at minimum and thus not practical for use by reason that a reduction ratio i of 1/120 is generally required to the electric motor having normal operational region of 1 to 1000 rpm. It is noted that the vibrations of the electric motor 2 and the primary reduction gear 20 have no effect on the resonance of the drive system. This is assumed to be because of the fact that these vibrations are relatively small and absorbed by the secondary reduction gear 21.

The description of vibration test will be now made as regards the reduction gear means 3 of the present invention comprising the primary, spur reduction gear 20 and the secondary, planetary reduction gear 21, and the comparative examples I, II and III shown in TABLE.

Figure 7:
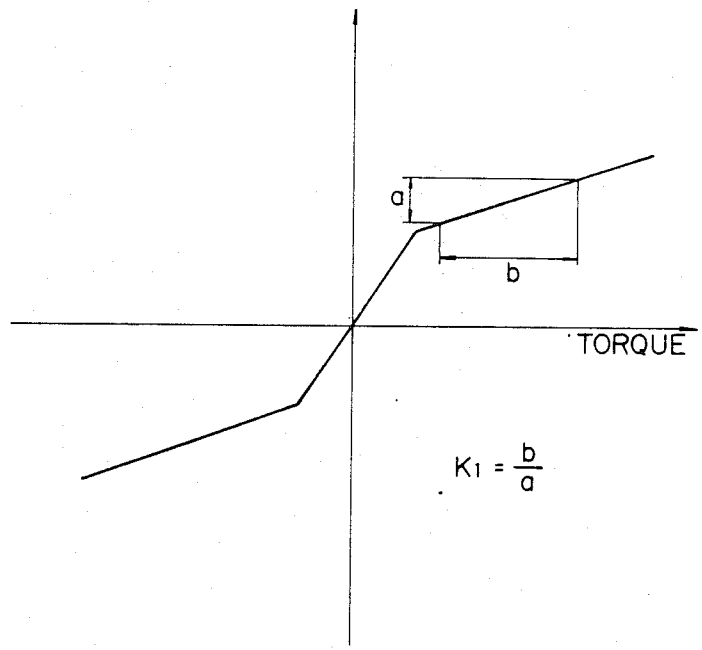
FIG. 7 shows a characteristic of spring constant under rotation of general reduction gear means.

The comparative example I comprises a primary, spur reduction gear and a secondary, planetary reduction gear. The planetary reduction gear is constructed, as in the embodiment described hereinbefore, such that the external gears are two and the phase difference of the external gears is 180°, in order to prevent unbalance caused by eccentric rotations of the crank shaft and the external gear and minimize the amplitude of the vibration, and that the number of teeth of the internal gear is larger than that of the external gear by one. The comparative example II comprises the above noted planetary reduction gear. The comparative example III comprises a harmonic reduction gear in which the number of teeth of the internal gear is larger than that of the external gear by two. The respective numbers of reduction stages, reduction ratios $i_1$ and $i_2$, torsion spring constants $K_1$ (FIG. 7) and moments of inertia J are shown in the following TABLE.

TABLE

| Kind of reduction gear | Embodiment according to the present invention Spur reduction gear and planetary reduction gear | Comparative example I Spur reduction gear and planetary reduction gear | Comparative example II Planetary reduction gear | Comparative example III Harmonic reduction gear |
|---|---|---|---|---|
| Number of reduction stages | 2 | 2 | 1 | 1 |
| Primary reduction ratio $i_1$ | ⅓ | 1/1.5 | 1/120 | 1/120 |
| Secondary reduction ratio $i_2$ | 1/40 | 1/80 | — | — |
| Total reduction ratio $i$ | 1/120 | 1/120 | 1/120 | 1/120 |
| Torsion spring constant $K_1$ (kg m/minute) | 37.5 | 37.5 | 22 | 17.4 |
| Moment of inertia J (kg s²/cm) | 2000 | 2000 | 2000 | 2000 |
| Number of rotations of electric motor at which peak of resonance occurs (rpm) | 1500 | 750 | 500 | 250 |
| Peak location (FIG. 4) of resonance | A | B | C | D |

Figure 4:
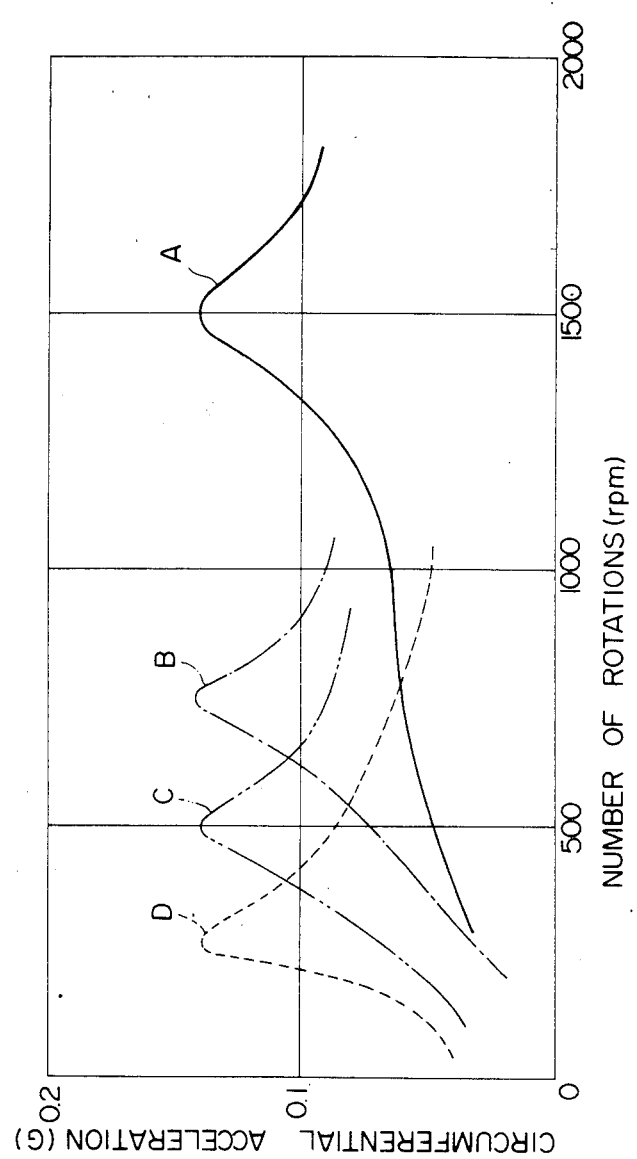
FIG. 4 shows peak locations of torsion resonances with the number of rotations of an electric motor in rpm taken on abscissa and with circumferential acceleration in G (acceleration of gravity, taken on the ordinate.
Figure 5:
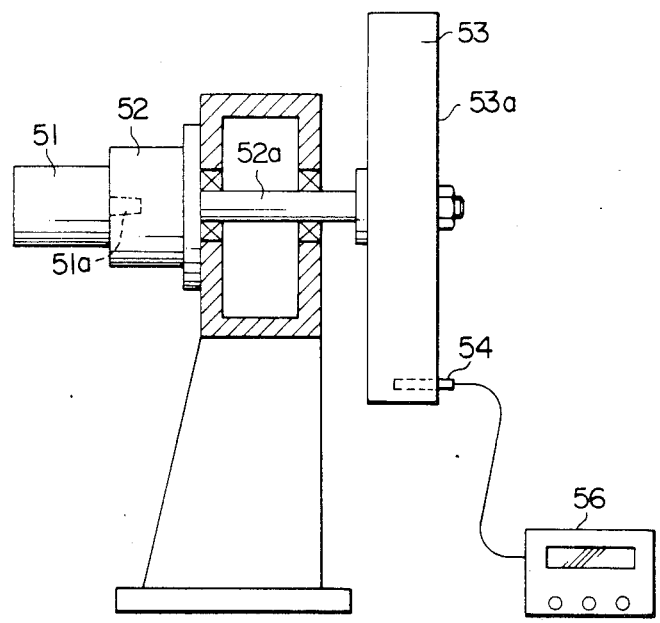
FIG. 5 depicts an apparatus by which the vibration test results shown in FIG. 4 are obtained.

The vibration test was made by the apparatus as shown in FIG. 5. An electric servo motor 51 is connected through its output shaft 51a to a reduction gear 52. The reduction gear 52 in turn is connected through its output shaft 52a with a flywheel 53 which serves as inertia load corresponding to moment of inertia J of the driven part (second robot arm 12) of the robot. In the peripheral end of the side surface 53a of the flywheel 53 is mounted an acceleration pick up 54 of piezo-electric element which is adapted to measure circumferential acceleration and amplitude. The acceleration pick up 54 is connected with an indicator 56. The characteristic frequency $\omega_0$ of the drive system comprising the motor 51, the reduction gear 52 and the flywheel 53 are adjusted to be about 8.4 hertz or 504 rpm which is substantially equal to the characteristic frequency $\omega_0$ of the drive system according to the present invention. The acceleration of the flywheel 53 is measured by varying the number of rotations of the electric motor 51. In FIG. 4 are shown the test results with the number of rotations of the electric motor 51 in rpm taken on abscissa and with circumferential acceleration, measured by the acceleration pick up 54, in G (acceleration of gravity) taken on the ordinate.

In the comparative examples I, II and III, peaks of the resonance occur at around 750 rpm, around 500 rpm and around 250 rpm, respectively, at which the electric motor 51 rotates. The respective resonances occur within the normal operational region of the electric motor 51 ranging 1 to 1000 rpm. However, in the embodiment according to the present invention, the resonance occurs around 1500 rpm which is beyond the normal operational region of the electric motor 2 ranging from 1 to 1000 rpm. From comparison between the comparative examples II and III, it will be seen that, regarding the number of rotations of the electric motor 51 at which the resonance occurs, the planetary reduction gear having a teeth difference of one between the internal and external gears is two times the harmonic reduction gear having a teeth difference of two. From comparison between the embodiment according to the invention and the comparative example I, it will also be seen that the number of rotations of the electric motor 51 at which the resonance occurs is proportional to the primary reduction ratio $i_1$ of the primary reduction gear.

A second preferred embodiment constructed in accordance with the present invention will be hereinafter described with reference to the drawings.

Figure 3:
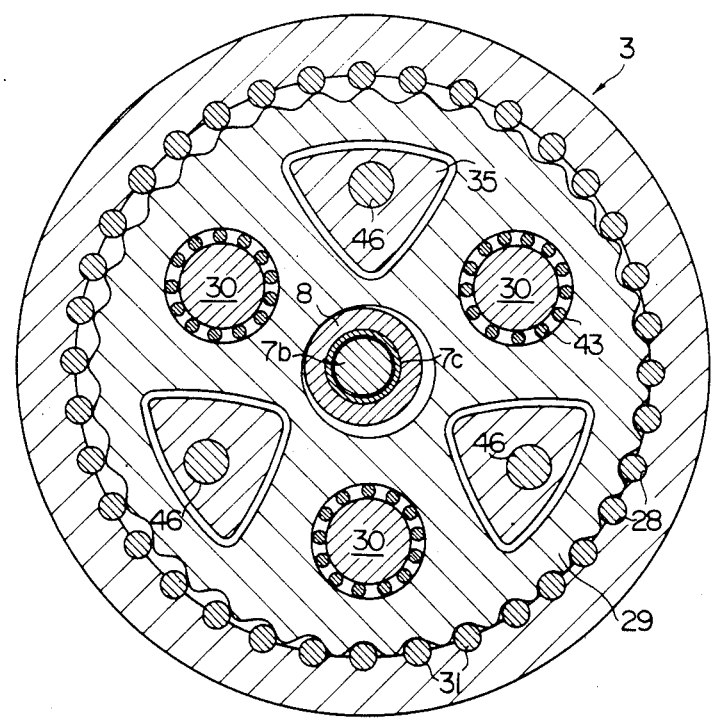
FIG. 3 is a sectional view of internal and external gears forming a part of the secondary reduction gear substantially taken along line III—III in FIG. 2.
Figure 6:
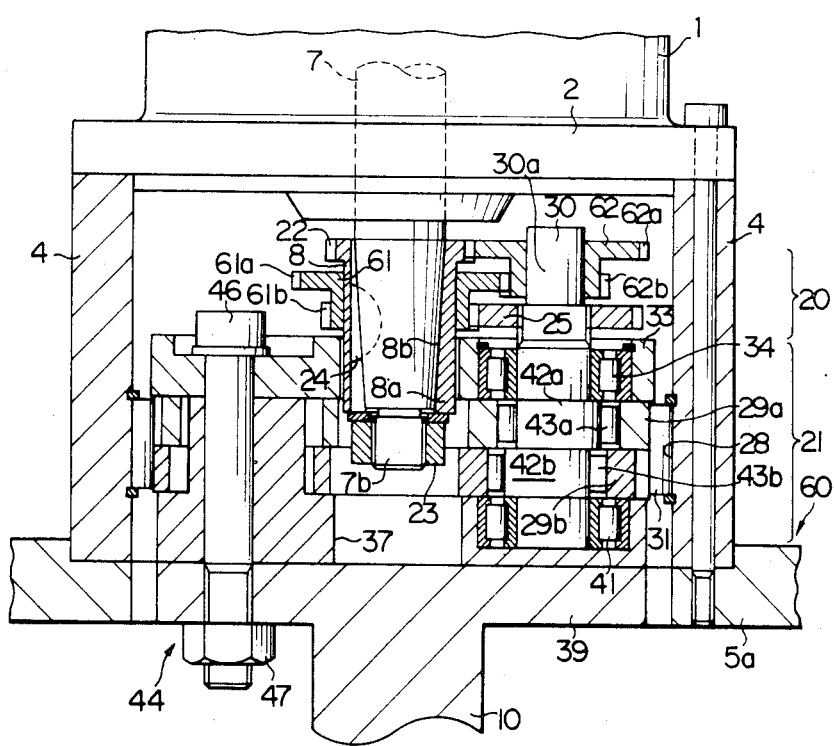
FIG. 6 is a modification of the reduction gear means shown in FIG. 2.

In FIG. 6, reduction gear means of the robot is indicated generally by reference numeral 60. An electric motor 2, a primary reduction gear 20 and a secondary, planetary reduction gear 21 are arranged in this order in a vertical direction. On the drive shaft 7 of the electric motor 2 is mounted an input shaft 8 which is integrally formed at its upward end adjacent the electric motor 2 with an input gear 22 of the primary reduction gear 20. On the input shaft 8 is rotatably carried a first idle gear 61 formed with a large gear 61a and a small gear 61b. The secondary reduction gear 21 has a crank shaft or eccentric input shaft 30 extending substantially parallel to the input shaft 8 and having at its upper end an extension 30a located adjacent the electric motor 2. On the extension of the crank shaft 30 is rotatably carried a second idle gear 62 which is formed with a large gear 62a meshing with and larger in number of teeth than the input gear 22 integral with the input shaft 8, and a small gear 62b meshing with and smaller in number of teeth than the large gear 61a of the first idle gear 61. The small gear 61b of the first idle gear 61 is held in mesh with an output gear 25 of the primary reduction gear 20 which is fixedly mounted on the crank shaft 30 of the secondary reduction gear 21. The output gear 25 is larger in number of teeth than the small gear 61b of the first idle gear 61. The input shaft 8, the input gear 22, the output gear 25, the extension 30a and the first and second idle gears 61 and 62 as a whole constitute the primary reduction gear 20. This arrangement in which the first and second idle gears 61 and 62 are provided is advantageous in that a required reduction ratio $i_1$ is obtained even in the case that an electric motor having a relatively larger shaft is employed. The components substantially identical to those of the first embodiment shown in FIGS. 1 through 3 are denoted by like reference numerals and therefore the description will be omitted.

A third preferred embodiment constructed in accordance with the present invention will be hereinafter described with reference to the drawings.

Figure 8:
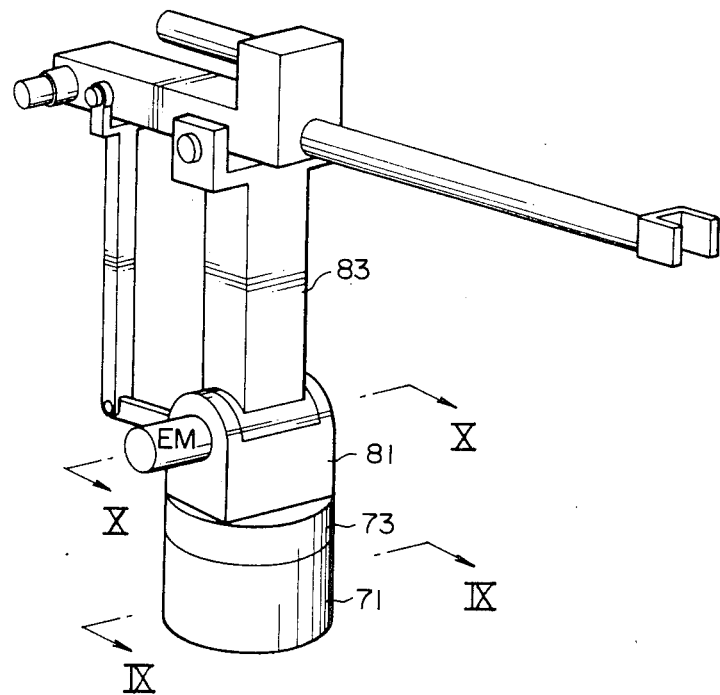
FIG. 8 is a diagrammatic perspective view showing another robot arm drive apparatus constructed in accordance with the present invention.
Figure 9:
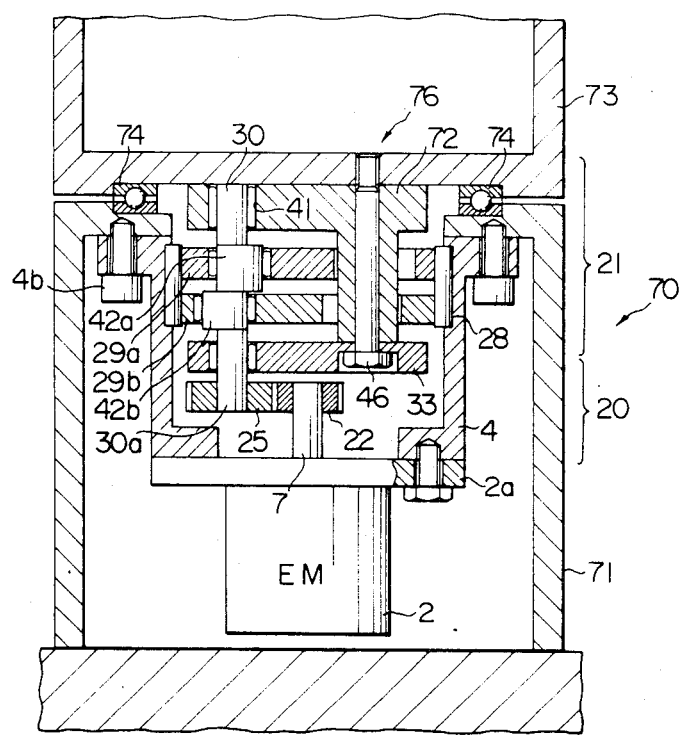
FIG. 9 is a sectional view of reduction gear means of the robot arm drive apparatus shown in FIG. 8 substantially taken along line IX—IX in FIG. 8.

In FIG. 9, reduction gear means of the industrial robot as shown in FIG. 8 is indicated generally by reference numeral 70. The reduction gear means 70 comprises a primary, parallel shaft type or spur reduction gear 20 and a secondary, planetary reduction gear 21 connected with the primary reduction gear 20. An electric motor 2 has an upwardly extending drive shaft 7 and is mounted on a first robot member 71 through a cylindrical support member 4 of the reduction gear means 70. On the drive shaft 7 of the electric motor 2 is mounted an input gear 22 forming a part of the primary reduction gear 20. The input gear 22 is held in mesh with a spur gear or output gear 25 which are connected with an eccentric input shaft 30. The secondary, planetary reduction gear 21 comprises an internal gear 28 mounted on the cylindrical support member 4, a pair of upper and lower external gears 29a and 29b each meshing with the internal gear 28, and the eccentric input shaft 30. The eccentric input shaft 30 is supported by a circular plate 33 forming a part of the planetary reduction gear 21 through a bearing. A block member designated by reference numeral 72 is interposed between the circular plate 33 and a second robot member 73. Carrier means 76 comprising the circular plate 33 and the block member 72 are connected to the second robot member 73 by means of a bolt 46. The second robot member 73 is rotatably supported on the first robot member 71 through bearings 74. The components substantially identical to those of the first embodiment shown in FIGS. 1 through 3 are denoted by like reference numerals and therefore the description therefor will be hereinafter omitted.

Figure 10:
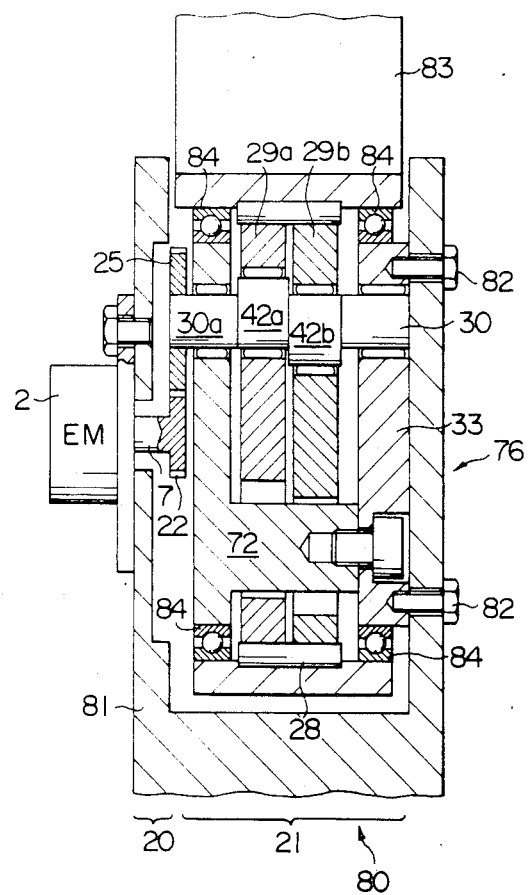
FIG. 10 is a sectional view showing another reduction gear means taken along line X—X.

FIG. 10 shows a fourth embodiment constructed in accordance with the present invention.

In FIG. 10, reduction gear means of the industrial robot as shown in FIG. 8 is indicated generally by reference numeral 80. Carrier means 76 constituted by a circular plate 33 and a block member 72 is connected with a first robot member 81 by means of a plurality of bolts 82. An internal gear 28 is connected with a second robot member 83 which is rotatably supported on the circular plate 33 and the block member 72. Thus, this embodiment differs from the third embodiment shown in FIG. 9 in that the internal gear 28 is connected with the second robot member 83 and the carrier means 76 is connected with the first robot member 81. The components substantially identical to those of the third embodiment shown in FIG. 9 are denoted by like reference numerals and therefore the description therefor will be hereinafter omitted.

Figure 11:
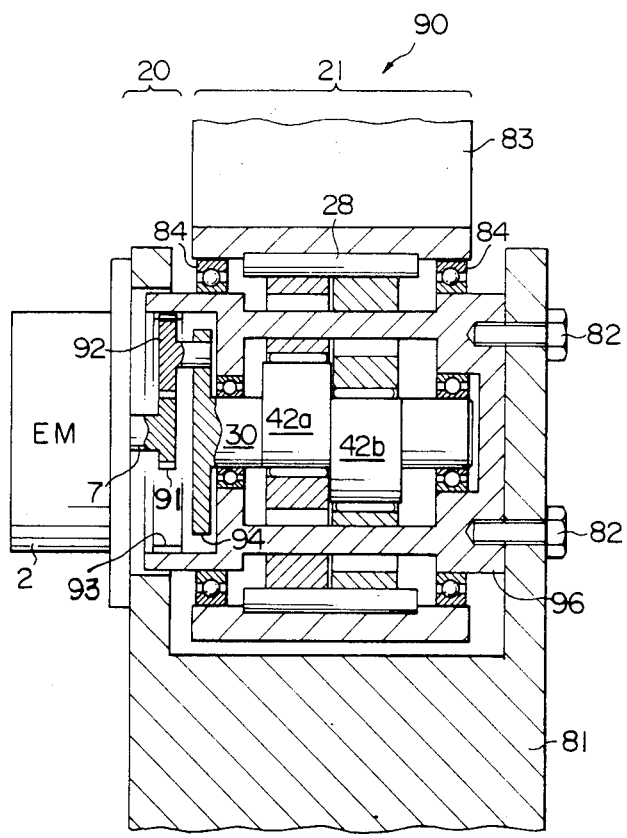
FIG. 11 is a modification of the reduction gear means shown in FIG. 10.

FIG. 11 shows a fifth embodiment constructed in accordance with the present invention. This embodiment is a modification of the embodiment shown in FIG. 10. Reduction gear means of the industrial robot as shown in FIG. 8 is indicated generally by reference numeral 90. A primary reduction gear 20 of the reduction gear means 90 comprises a sun gear 91 connected with the drive shaft 7 of the electric motor 2, a planet gear 92 held in mesh with the sun gear 91, a fixed ring gear 93 held in mesh with the planet gear 92, and an output arm 94 connected at its one end with the planet gear 92 and at its the other end with the eccentric input shaft 30. The eccentric input shaft 30 is rotatably supported by carrier means 96 so that a center axis of the eccentric input shaft 30 is aligned with a center axis of the carrier means 96. The components substantially identical to those of the embodiment shown in FIG. 10 are denoted by like reference numerals and therefore the description will be omitted.

It is noted that the reduction ratio of the primary reduction gear may be such that the speed of the electric motor is reduced to a value corresponding to a frequency which is slightly less than the frequency at which the resonance occurs, that is, the characteristic torsion frequency of the drive system. For example, in the case that the characteristic torsion frequency $\omega_o$ of the drive system is 5 to 9 hertz and the number of rotations of the electric motor is 1000 rpm at maximum and the total reduction ratio i is 1/60 to 1/320, a robot arm drive apparatus in which occurrence of resonance is prevented effectively is provided by making the primary reduction ratio $i_1$ about 1/1.9 to about 1/6 at minimum and the secondary reduction ratio $i_2$ about 1/25 to about 1/60. In the case that the characteristic torsion frequency $\omega_o$ of the drive system is 5 to 9 hertz and the number of rotations of the electric motor is 2000 rpm at maximum and the total reduction ratio 1/110 to 1/320, the primary reduction ratio $\omega_1$ may be made about 1/3.7 to about 1/6.7 at minimum and the secondary reduction ratio $i_2$ may be made about 1/25 to about 1/60. In the case that the characteristic torsion frequency $\omega_o$ of the drive system is 5 to 9 hertz and the number of rotations of the electric motor is 4000 rpm at maximum and the total reduction ratio i is 1/210 to 1/640, the primary reduction ratio $i_1$ may be made about 1/7.4 to about 1/13.3 at minimum and the secondary reduction ratio $i_2$ may be made about 1/30 to about 1/60. Also, in the case that the characteristic torsion frequency $\omega_o$ of the drive system is 10 to 15 hertz and the number of rotations of the electric motor is 1000 rpm at maximum and the total reduction ratio i is 1/80 to 1/300, the primary reduction ratio $i_1$ may be made about 1/1.5 to about ¼ at minimum and the secondary reduction ratio $i_2$ may be made 1/25 to 1/60 so that the occurrence of the resonance can be transferred outside the normal operational region. Similarly, in the case that the characteristic torsion frequency $\omega_o$ is 10 to 15 hertz and the number of rotations of the electric motor is 4000 rpm at maximum and the total reduction ratio is 1/125 to 1/600, the primary reduction ratio $i_1$ may be made about 1/4.5 to about 1/10 and the secondary reduction ratio $i_2$ may be made about 1/30 to about 1/100.

What is claimed is:

1. A robot arm drive apparatus of an industrial robot comprising:
   an electric motor having a drive shaft;
   a first robot member having said electric motor mounted thereon;
   a second robot member rotatably supported on said first robot member; and
   reduction gear means for reducing rotation of said electric motor and then transmitting to said second robot member;
   said reduction gear means comprising a primary reduction gear for reducing said rotation of said electric motor and a secondary, planetary reduction gear for further reducing rotation of output of said primary reduction gear;
   said electric motor, when in normal operation, having the number of rotations which include the characteristic torsion frequency of a drive system comprising said electric motor, said second robot member and said reduction gear means;

said primary reduction gear having a reduction ratio so that the maximum number of rotations of said electric motor is reduced less than said characteristic torsion frequency of the drive system;

said secondary reduction gear comprising an eccentric input shaft connected with said primary reduction gear, an external gear which is rotatable eccentrically in response to rotation of said input shaft, an internal gear held in mesh with and larger in number of teeth than said external gear by one, and carrier means held in engagement with said external gear.

2. A robot arm drive apparatus of an industrial robot as set forth in claim 1, in which a plurality of said eccentric input shafts are supported equiangularly on a circumferential end portion of said carrier means and in which said primary reduction gear is of the parallel shaft type reduction gear which comprises an input shaft, an input gear provided on said input shaft, and a plurality of output gears held in mesh with said input gear and respectively connected with said eccentric input shafts of said secondary reduction gear.

3. A robot arm drive apparatus of an industrial robot as set forth in claim 2, in which said electric motor, said secondary reduction gear and said primary reduction gear are arranged in the order just recited in a vertical direction which is substantially parallel to an axis of rotation of said drive shaft of said electric motor and in which said drive shaft of said electric motor extends through central openings formed in said external gear and a central opening formed in said carrier means and is connected with said input shaft of said primary reduction gear.

4. A robot arm drive apparatus of an industrial robot as set forth in claim 2, in which said electric motor, said primary reduction gear and said secondary reduction gear are arranged in the order just recited in a vertical direction which is substantially parallel to an axis of rotation of said drive shaft of said electric motor and in which said primary reduction gear further comprises, between said input gear and said output gears thereof, a first idle gear mounted on said input shaft thereof and a second idle gear mounted on each of said eccentric input shafts thereof.

5. A robot arm drive apparatus of an industrial robot as set forth in claim 1, in which said eccentric input shaft of said secondary reduction gear is rotatably supported by said carrier means so that a center axis of said eccentric input shaft is aligned with a center axis of said carrier means, and in which said primary reduction gear comprises a sun gear connected with said drive shaft of said electric motor, a planet gear held in mesh with said sun gear, and an output arm connected at its one end with said planet gear and at its the other end with said eccentric input shaft.

6. A robot arm drive apparatus of an industrial robot as set forth in claim 1, in which said internal gear is connected with said second robot member and said carrier means is connected with said first robot member.

7. A robot arm drive apparatus of an industrial robot as set forth in claim 1, in which said internal gear is connected with said first robot member and said carrier means is connected with said second robot member.

8. A robot arm drive apparatus of an industrial robot as set forth in claim 1, in which said reduction ratio of said primary reduction gear is larger than a ratio between said characteristic torsion frequency of said drive system and said maximum number of rotations of said electric motor.

9. A robot arm drive apparatus of an industrial robot as set forth in claim 1, in which said characteristic torsion frequency of said drive system is between 5 and 9 hertz, said number of rotations of said electric motor which is in normal operation is between 1 and 1000 rpm, the minimum reduction ratio of said primary reduction gear is between 1/1.5 and 1/6, a reduction ratio of said secondary reduction gear is between 1/25 and 1/60, and the total reduction ratio of said primary reduction gear and said secondary reduction gear is between 1/60 and 1/320.

10. A robot arm drive apparatus of an industrial robot as set forth in claim 1, in which said characteristic torsion frequency of said drive system is between 5 and 9 hertz, said number of rotations of said electric motor which is in normal operation is between 1 and 2000 rpm, the minimum reduction ratio of said primary reduction gear is between 1/3.7 and 1/6.7, a reduction ratio of said secondary reduction gear is between 1/25 and 1/60, and the total reduction ratio of said primary reduction gear and said secondary reduction gear is between 1/110 and 1/320.

11. A robot arm drive apparatus of an industrial robot as set forth in claim 1, in which said characteristic torsion frequency of said drive system is between 5 and 9 hertz, said number of rotations of said electric motor which is in normal operation is between 1 and 4000 rpm, the minimum reduction ratio of said primary reduction gear is between 1/7.4 and 1/13.3, a reduction ratio of said secondary reduction gear is between 1/30 and 1/60, and the total reduction ratio of said primary reduction gear and said secondary reduction gear is between 1/210 and 1/640.

* * * * *